United States Patent Office 3,769,361
Patented Oct. 30, 1973

3,769,361
OXYDEHYDRODIMERIZATION OF PROPYLENE AND ISOBUTYLENE
Hans R. Friedli, Midland, Mich., assignor to The Dow Chemical Company, Midland, Mich.
No Drawing. Filed June 14, 1971, Ser. No. 153,044
Int. Cl. C07c 11/12, 5/27
U.S. Cl. 260—673
8 Claims

ABSTRACT OF THE DISCLOSURE

Addition of chlorine, bromine, or iodine to a mixed feed stream of oxygen and propylene or isobutylene increases the conversion of olefin to oxidatively dimerized hydrocarbons at the expense of carbon oxides and causes production of a monocyclic aromatic hydrocarbon when the feed stream is passed at an elevated temperature over a manganese oxide catalyst modified with a Group I-A or II-A metal oxide.

BACKGROUND OF THE INVENTION

The present invention relates to a modification in a known process whereby not only are improved results obtained, but there is also provided a substantial amount of a different kind of product.

The oxidative dehydrodimerization of lower alkenes at high temperatures in the presence of a manganese oxide catalyst modified with a Group I-A or II-A metal oxide in an atomic ratio of Group I-A or II-A metal to manganese of at least 0.5 is described in my U.S. Pat. 3,494,972. In this known process, a considerable portion of the oxygen in the oxygen-olefin feed stream is converted to carbon dioxide and carbon monoxide and substantially none of the olefin component is converted to aromatic products, the hydrocarbon product being essentially a dehydrodimer produced by the linking of two molecules of olefin with elimination of one molecule of hydrogen. Thus, with propylene as the olefin reactant, the hydrocarbon product of the oxidation is almost entirely 1,5-hexadiene.

It is also known that in a somewhat similar process wherein an olefin-oxygen mixture is passed at high temperatures over a manganese catalyst containing a lesser proportion of a Group I-A or II-A metal oxide and wherein the feed mixture also contains a halogen promoter, the oxidation produces an aliphatic hydrocarbon having a higher degree of unsaturation. In this procedure, dehydrogenation rather than dimerization is the result and there is no indication that any appreciable quantity of aromatic hydrocarbons is formed. Variations of this process are disclosed in U.S. Pats. 3,308,187; 3,308,192; and 3,308,199.

SUMMARY OF THE INVENTION

It has now been found that in the process wherein a mixture of propylene or isobutylene with a half molar proportion or less of oxygen is passed at elevated temperature over a catalyst which is essentially manganese oxide plus a Group I-A or II-A metal oxide in an atomic proportion of Group I-A or II-A metal to manganese of at least 0.5, not only improved but also different results are obtained when the gas feed stream contains about 0.001-0.1 atom of chlorine, bromine, or iodine per mole of olefin. The unexpectedly different result thereby obtained is the production of a monocyclic aromatic hydrocarbon representing the combination of two molecules of olefin as a significant component of the effluent product. Substantial improvement in the process is also provided in that the halogen additive considerably depresses the complete or deep oxidation of the olefin to carbon oxides and raises the proportion of olefin converted to the aliphatic dehydrodimer formed by oxidative dimerization.

DETAILED DESCRIPTION

The halogen additive is preferably added in a proportion of about 0.001–0.01 atom of halogen per mole of olefin. In referring herein to the halogen additive, whether chlorine, bromine, or iodine, both the elemental halogen and any halogen compound which is vaporizable or decomposable under process conditions so as to be a source of halogen or hydrogen halide are meant. Thus, halides such as HCl, HBr, HI, the ammonium halides, alkyl halides such as methyl iodide and ethyl bromide, and other organic halides of less than six carbon atoms such as ethylene bromohydrin, chloroform, carbon tetrabromide, and methylene iodide are suitable halogen sources. Mixed halogens such as $I_2$ plus $Br_2$, BrCl, or a mixture of HI and HBr can also be used to obtain the same result. The hydrogen halides and elemental halogens are preferred halogen sources.

Other conditions of the process are as described in my prior patent, U.S. 3,494,972. These are summarized in the following sections, a more detailed discussion being found in the above patent which is hereby incorporated by reference.

CATALYST

The modified manganese catalyst is a combination of manganese and at least one metal from Groups I-A and II-A of the Periodic Table, the metals being present as their oxides, or a combination of oxide and carbonate, under process conditions. The atomic ratio of Group I-A or II-A metal to manganese is at least 0.5/1, preferably about 0.5–6/1. Representative Group I-A and II-A metals are the alkali metals Li, Na, and K and the alkaline earth metals Mg, Ca, Ba, and Sr. Sodium is a preferred metal of this class.

The catalyst can be prepared as a powder, granules, or pellets of a bulk mixture of compounds of manganese and the promoter metal or metals, together with such inert additives as may be required to facilitate granulating or pelleting, for example, lubricants and binders. Suitable metal compounds are the oxides, hydroxides, carbonates, or any other metal compounds which are thermally decomposable or oxidizable to the oxides. Supported catalysts where the active components are deposited on or impregnated into an inert support are a preferred form. For example, supports such as silicon carbide, aluminum silicate, or alumina can be soaked in an aqueous solution of the metal nitrates or acetates, then dried and roasted in air to convert the salts to the metal oxides. Supports having a relatively low surface area are preferred, for example, 0.01–10 sq. meters per gram. Supports having higher surface areas are likely to produce overactive catalysts which favor complete oxidation of olefin to carbon oxides. A catalyst of manganese and sodium oxides on alumina containing about 0.1–2 weight percent of Mn is most preferred. It has been found that as the proportion of manganese in the catalyst is increased, the aromatic fraction of the hydrocarbon product is also increased.

PROCESS CONDITIONS

The dimerization and aromatization reaction is operable at about 450–700° C. and it is preferably run at 550–650° C. Contact times of 0.1–5 seconds are appropriate with a time of 0.2–1 second being preferred. Contact time is defined as the time required at a particular flow rate for an equal volume of feed gas at standard pressure and temperature to pass through the catalyst bed.

Olefin to oxygen mole ratios of 2–20 to 1 are operable with a ratio in the range of 4–10/1 being preferred. The process can be operated at any pressure from subatmospheric pressure to superatmospheric pressure of ten atmospheres or more. Operation at or about normal atmospheric pressure is usually most convenient and is preferred.

REACTION PRODUCTS

The major hydrocarbon product of the halogen-modified reaction is a 1,5-hexadiene, the compound itself when propylene is the olefin reactant. When isobutylene is the olefin, the corresponding 2,5-dimethyl-1,5-hexadiene is produced while a mixture of propylene and isobutylene produces 2-methyl-1,5-hexadiene as well as the other two dienes in the statistically expected proportions. The aromatic hydrocarbon product is the second most abundant hydrocarbon product of the reaction. This is benzene in the case of propylene, xylene in the case of isobutylene, and a mixture of benzene, xylene, and toluene when a mixture of propylene and isobutylene is used as the olefin reactant. Unexpectedly, isobutylene produces a mixture of isomeric xylenes rather than solely the para isomer as would normally be expected.

Although 1-butene and 2-butene undergo the dehydrodimerization reaction to produce octadienes in the process where no halogen is present in the feed, no aromatic products are found when bromine or iodine is added to the feed gas. The production of aromatic hydrocarbons appears to be unique for the halogen-modified process when propylene and/or isobutylene is the olefin reactant.

Example 1

The fixed bed reactor was a vertically mounted 15 mm. O.D. Vycor tube 350 mm. long with a central axial 5 mm. O.D. thermowell. A portion of 4–8 mesh $\alpha$-alumina was put in the lower part of the reactor to support the catalyst bed. The impregnated alumina catalyst was then loaded in and additional $\alpha$-alumina put on top of the catalyst to serve as a preheating zone. The reactor was heated by external resistance elements automatically controlled so as to maintain the catalyst bed within 2° C. of the desired temperature.

A metered olefin-oxygen mixture was fed into the preheating zone and the effluent product was collected at the bottom outlet of the reactor where the effluent was cooled and subjected to gas-liquid chromatographic analysis and continuous mass spectrometric examination. Total effluent samples were collected at intervals by condensing at liquid nitrogen temperature and evaporating components boiling below $C_3$'s.

The catalyst was prepared by impregnating 8–14 mesh $\alpha$-alumina with an aqueous solution of manganese and sodium acetates, partially decomposing the metal salts by heating the impregnated support in air at 135° C., and completing the thermal decomposition in the reactor under process conditions, that is, in contact with the mixed gas feed at 625° C. The final catalyst bed consisted of 2 g. of impregnated alumina containing 0.37 percent by weight of manganese with a Na/Mn atomic ratio=2.32.

The catalyst was allowed to equilibrate for about 15 hours at 627° C. with a flow of 200 ml./min. of propene plus 50 ml./min. of oxygen through the catalyst bed. After equilibration, 0.0027 mole HBr per mole of olefin was added to the feed stream by bubbling the mixed feed through 7.9% aqueous HBr. The reaction of the HBr-containing feed came to equilibrium after a few hours. The effluent product at equilibrium conditions before and after HBr addition was analyzed as described above and conversions and selectivities for various components were calculated on the basis of these results. Conversion was calculated as the percentage of the oxygen or propylene in the feed which disappeared and the selectivity for each product was calculated as the percentage of the converted propylene which was accounted for as that product. Also included for purpose of comparison are runs made under conditions described above but with no catalyst in the reactor, with and without HBr added to the feed.

TABLE 1

| Promoter | Percent conversion | | Percent selectivity | | |
|---|---|---|---|---|---|
| | $O_2$ | $C_3H_6$ | $CO+CO_2$ | $C_6H_{10}$ [1] | $C_6H_6$ [2] |
| None | 43.8 | 4.8 | 47.6 | 40.1 | 1.7 |
| HBr | 57.8 | 9.0 | 34.5 | 46.6 | 7.4 |
| No catalyst, no HBr | 13.6 | 3.9 | 11.0 | 47.4 | None |
| No catalyst, HBr [3] | 14.2 | 3.3 | 10.6 | 52.7 | None |

[1] 1,5-hexadiene.
[2] Benzene.
[3] 0.007 mole HBr/mole propylene.

Example 2

The procedure of Example 1 was repeated using catalysts of the same manganese content but with Na/Mn atomic ratios of zero and 0.5 respectively. The results with the catalyst of Example 1 are included also.

TABLE 2

| Promoter | Na/Mn | Percent conversion | | Percent selectivity | | |
|---|---|---|---|---|---|---|
| | | $O_2$ | $C_3H_6$ | $CO+CO_2$ | $C_6H_{10}$ | $C_6H_6$ |
| None | 0 | 100 | 7.9 | 73.5 | 19.1 | 1.8 |
| HBr | 0 | 81.1 | 8.4 | 51.0 | 32.2 | 3.1 |
| None | 0.5 | 58.4 | 4.8 | 65.6 | 23.6 | 1.7 |
| HBr | 0.5 | 48.1 | 7.5 | 33.1 | 44.4 | 6.1 |
| None | 2.32 | 43.8 | 4.8 | 47.6 | 40.1 | 1.7 |
| HBr | 2.32 | 57.8 | 9.0 | 34.5 | 46.6 | 7.4 |

Example 3

A catalyst was made up by impregnating $\alpha$-alumina granules with aqueous sodium and manganese nitrates and roasting the impregnated alumina at 600° C. in oxygen. The finished catalyst contained 0.49% Mn and had a Na/Mn atomic ratio of 2.05. This procedure made a highly active catalyst.

The experimental procedure of Example 1 was followed with this catalyst except that the proportion of HBr in the propylene-oxygen feed was varied. Runs were made at 621–626° C.

TABLE 3

| Mole ratio HBr/$C_3H_6$ | Percent conversion | | Percent selectivity | | |
|---|---|---|---|---|---|
| | $O_2$ | $C_3H_6$ | $CO+CO_2$ | $C_6H_{10}$ | $C_6H_6$ |
| No HBr | 85.3 | 7.6 | 60.8 | 30.0 | 1.4 |
| 0.0026 | 92.5 | 13.7 | 35.4 | 45.8 | 9.9 |
| 0.0053 | 93.3 | 12.4 | 39.4 | 39.6 | 9.7 |
| 0.0099 | 88.5 | 11.8 | 39.6 | 39.2 | 9.7 |

Example 4

The procedure of Example 3 was repeated with the same catalyst but using HI as the promoter.

TABLE 4

| Mole ratio HI/$C_3H_6$ | Percent conversion | | Percent selectivity | | |
|---|---|---|---|---|---|
| | $O_2$ | $C_3H_6$ | $CO+CO_2$ | $C_6H_{10}$ | $C_6H_6$ |
| No HI | 85.3 | 7.6 | 60.8 | 30.0 | 1.4 |
| 0.0014 | 81.5 | 11.2 | 41.3 | 30.0 | 12.0 |

Example 5

A catalyst was made up generally as described in Example 1 except that the preliminary decomposition in air was run at 165° C. The finished catalyst contained 0.81% Mn and the Na/Mn atomic ratio was 1.77. Runs were made with a mixed propylene-oxygen feed as in Example 1 but at 650° C. catalyst bed temperature, with and without HBr promoter.

TABLE 5

| Mole ratio HBr/$C_3H_6$ | Percent conversion | | Percent selectivity | | |
|---|---|---|---|---|---|
| | $O_2$ | $C_3H_6$ | $CO+CO_2$ | $C_6H_{10}$ | $C_6H_6$ |
| No HBr | 99.8 | 7.7 | 71.0 | 21.9 | 2.4 |
| 0.009 | 81.1 | 13.8 | 33.3 | 33.3 | 14.1 |

Example 6

The procedure of Example 1 was repeated using the same catalyst but substituting isobutylene for propylene as the olefin being dimerized. Using HBr as the halogen promoter, somewhat decreased conversion of olefin was obtained as compared to propylene. The principal hydrocarbon products obtained were 2,5-dimethyl-2,4-hexadiene, a smaller amount of a triene, probably 2,5-dimethyl-1,3,5-hexatriene, and, with the HBr promoter, a substantial quantity of xylene. The latter aromatic product was a mixture of m-xylene and p-xylene rather than the para isomer which would be expected.

Examples 7–8

Alumina granules were impregnated with aqueous manganese and sodium acetates and heated to obtain a catalyst containing 0.81% Mn and 0.60% Na with an atomic ratio Na/Mn=1.77. Following the general procedure of Example 1, mixtures of oxygen and isobutylene with HI added as noted in the form of 7.9% and 24% aqueous solutions respectively were passed over the catalyst and the condensed oxydehydrodimer fraction was analyzed. The isobutylene feed rate was 0.536 g. mole per hour with an isobutylene/oxygen mole ratio of 4.0 and a residence time of 0.3 second. The results are listed in Table 6.

TABLE 6

| Mole ratio HI/C₄H₈ | Percent conversion oxygen | Temp. (° C.) | Percent of dimer product¹ | |
|---|---|---|---|---|
| | | | Aliphatic | Xylene |
| 0.0023 | 90.3 | 600 | 74.7 | 25.3 |
| 0.0076 | 47.8 | 580 | 48.7 | 51.3 |

¹ The aliphatic fraction was a mixture of 2,5-dimethyl-2,4-hexadiene with a smaller amount of the corresponding triene. The xylene fraction in each case was a mixture of isomers with the higher HI concentration in the feed favoring a higher proportion of the ortho and meta isomers.

When chlorine, HCl, or other chlorine-containing compound as previously defined is used as the halogen source in the procedures of the above examples, similar results are obtained although olefin conversions are somewhat lower than those obtained with bromine or iodine as the halogen additive, the order of promoter activity in this reaction being I>Br>Cl.

I claim:

1. In a process for dehydrodimerizing propylene, isobutylene, or a mixture thereof which comprises contacting (1) a gaseous mixture of oxygen, and the olefin reactant at 450–700° C. with (2) a catalyst comprising manganese oxide in combination with sufficient Group I-A or II-A metal oxide to provide an atomic ratio of Group I-A or II-A metal to manganese of at least 0.5, wherein the olefin/oxygen mole ratio is 2–20/1, the improvement of including in the oxygen-olefin feed mixture about 0.001–0.1 atom of halogen per mole of olefin wherein the halogen is chlorine, bromine, iodine, or a mixture thereof, thereby producing a monocyclic aromatic hydrocarbon dehydrodimer of said olefin as a substantial product.

2. The process of claim 1 wherein the catalyst is a combination of manganese and sodium oxides in a proportion of 0.5–6 atoms of sodium per atom of manganese.

3. The process of claim 2 wherein the catalyst is supported on granules of alumina.

4. The process of claim 1 wherein the olefin/oxygen mole ratio is 4–10/1.

5. The process of claim 1 wherein the halogen is bromine in the form of HBr.

6. The process of claim 1 wherein the halogen is iodine in the form of HI.

7. The process of claim 1 wherein the olefin is propylene.

8. The process of claim 1 wherein the olefin is isobutylene.

References Cited

UNITED STATES PATENTS

| 3,308,187 | 3/1967 | Bajars | 260—680 D |
| 3,308,189 | 3/1967 | Bajars | 260—680 D |
| 3,308,192 | 3/1967 | Bajars | 260—680 D |
| 3,308,199 | 3/1967 | Bajars | 260—680 D |
| 3,207,801 | 9/1965 | Frilette et al. | 260—673.5 |
| 3,494,972 | 2/1970 | Friedli | 260—680 R |

DELBERT E. GANTZ, Primary Examiner

J. M. NELSON, Assistant Examiner

U.S. Cl. X.R.

260—680 R